US010197895B2

(12) United States Patent
Sakurai et al.

(10) Patent No.: US 10,197,895 B2
(45) Date of Patent: Feb. 5, 2019

(54) PROJECTION DISPLAY DEVICE

(71) Applicant: HAMAMATSU PHOTONICS K.K., Hamamatsu-shi, Shizuoka (JP)

(72) Inventors: Naoto Sakurai, Hamamatsu (JP); Akihiro Oguri, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/562,008

(22) PCT Filed: Mar. 2, 2016

(86) PCT No.: PCT/JP2016/056384
§ 371 (c)(1),
(2) Date: Sep. 27, 2017

(87) PCT Pub. No.: WO2016/158174
PCT Pub. Date: Oct. 6, 2016

(65) Prior Publication Data
US 2018/0095351 A1     Apr. 5, 2018

(30) Foreign Application Priority Data

Mar. 31, 2015   (JP) ................................ 2015-072483

(51) Int. Cl.
*G02B 21/00*     (2006.01)
*G03B 21/20*     (2006.01)
(Continued)

(52) U.S. Cl.
CPC .......... *G03B 21/2033* (2013.01); *B60K 35/00* (2013.01); *G02B 5/0215* (2013.01);
(Continued)

(58) Field of Classification Search
CPC ............ G03B 21/2033; G03B 21/2053; G02B 26/10; G02F 1/1333; G09G 3/006; G09G 3/02; G09G 3/34; H05B 33/0854
(Continued)

(56) References Cited

U.S. PATENT DOCUMENTS

| 6,377,403 | B1 | 4/2002 | Smith |
| 2007/0008501 | A1* | 1/2007 | Yamazaki ............ H04N 9/3129 |
| | | | 353/97 |

(Continued)

FOREIGN PATENT DOCUMENTS

| JP | H4-506411 | 11/1992 |
| JP | H10-111256 | 4/1998 |

(Continued)

OTHER PUBLICATIONS

Translate_WO2015004724A1.*
International Preliminary Report on Patentability dated Oct. 12, 2017 for PCT/JP2016/056384.

*Primary Examiner* — Douglas W Owens
*Assistant Examiner* — Syed M Kaiser
(74) *Attorney, Agent, or Firm* — Drinker Biddle & Reath LLP

(57) ABSTRACT

A projection display device includes: a light source that emits a first and a second laser lights; a scanning drive mirror that reflects the first and the second laser lights, and uses the first and the second laser lights in scanning; a light diffusion unit that includes a predetermined region that allows the first laser light to be transmitted therethrough, and diffuses the first laser light; a light detection unit that detects the second laser light that passed the predetermined region; and a control unit that executes a process to detect the second laser light, and determines a state of the predetermined region on the basis of a detection value of the light detection unit. In a case where the control unit determines (Continued)

that a defect occurs in the predetermined region as the state, the control unit executes a process to stop displaying the projection.

8 Claims, 11 Drawing Sheets

(51) Int. Cl.
| | | |
|---|---|---|
| B60K 35/00 | (2006.01) | |
| G02B 26/10 | (2006.01) | |
| H04N 5/74 | (2006.01) | |
| G02F 1/1333 | (2006.01) | |
| G09G 3/00 | (2006.01) | |
| G09G 3/02 | (2006.01) | |
| G09G 3/34 | (2006.01) | |
| H04N 9/31 | (2006.01) | |
| G02B 5/02 | (2006.01) | |
| G03B 21/26 | (2006.01) | |

(52) U.S. Cl.
CPC ........... *G02B 5/0278* (2013.01); *G02B 26/10* (2013.01); *G02B 26/101* (2013.01); *G02F 1/1333* (2013.01); *G03B 21/2053* (2013.01); *G03B 21/2086* (2013.01); *G03B 21/26* (2013.01); *G09G 3/006* (2013.01); *G09G 3/02* (2013.01); *G09G 3/34* (2013.01); *H04N 5/74* (2013.01); *H04N 9/3129* (2013.01); *H04N 9/3155* (2013.01); *B60K 2350/2021* (2013.01); *B60K 2350/2047* (2013.01); *B60K 2350/2052* (2013.01); *B60K 2350/2078* (2013.01); *B60K 2350/352* (2013.01)

(58) Field of Classification Search
USPC ............ 359/196.1, 443, 641, 601, 838, 904; 315/129
See application file for complete search history.

(56) References Cited

U.S. PATENT DOCUMENTS

| | | | |
|---|---|---|---|
| 2010/0202725 A1* | 8/2010 | Popovich ............... | G02B 27/48 385/10 |
| 2012/0242960 A1* | 9/2012 | Oiwa ..................... | G02B 27/48 353/31 |
| 2013/0300716 A1* | 11/2013 | Craven-Bartle ...... | G06F 3/0421 345/175 |
| 2014/0043591 A1* | 2/2014 | Kurashige .............. | G02B 27/48 353/85 |
| 2016/0266283 A1* | 9/2016 | Segawa ................ | G02B 3/0006 |
| 2016/0334637 A1* | 11/2016 | Saisho ................ | G02B 27/0101 |
| 2017/0010473 A1* | 1/2017 | Ide ........................ | H04N 9/3129 |
| 2018/0052322 A1* | 2/2018 | Kubota .............. | G02B 27/0101 |

FOREIGN PATENT DOCUMENTS

| | | |
|---|---|---|
| JP | 2000-197069 A | 7/2000 |
| JP | 2006-243225 | 9/2006 |
| JP | 2007-17649 A | 1/2007 |
| JP | 2008-180921 | 8/2008 |
| JP | 2010-231191 A | 10/2010 |
| JP | 2010-281772 | 12/2010 |
| JP | 2013-200474 A | 10/2013 |
| JP | 2014-139656 | 7/2014 |
| JP | 2014-171130 A | 9/2014 |
| JP | 2015-22251 A | 2/2015 |
| WO | WO 2004/109390 A1 | 12/2004 |
| WO | WO 2014/141431 | 9/2014 |
| WO | WO-2015/004724 A1 | 1/2015 |

\* cited by examiner

PROJECTION DISPLAY DEVICE

TECHNICAL FIELD

The present invention relates to a projection display device.

BACKGROUND ART

As a projection display device in the related art, there is known a projection display device including a light source that emits a laser light for displaying a projection, a drive reflection unit that reflects the laser light emitted from the light source and performs scanning with the laser light, a light diffusion unit including a predetermined region in which the laser light used in the scanning by the drive reflection unit is diffused, and a detection unit that detects detachment of the light diffusion unit (for example, refer to Patent Literature 1).

CITATION LIST

Patent Literature

Patent Literature 1: Japanese Unexamined Patent Publication No. 2013-200474

SUMMARY OF INVENTION

Technical Problem

In the above-described projection display device, it is possible to detect the detachment of the light diffusion unit, but it is difficult to grasp a defect such as a damage that occurs in the predetermined region of the light diffusion unit. Therefore, there is a concern that displaying a projection may be performed by the light diffusion unit in which a defect such as a damage occur in the predetermined region. In this case, there is a concern that a laser light may not be appropriately diffused due to the defect such as the damage that occurs in the predetermined region of the light diffusion unit, and a burden may be placed on eyes of a person who views the projection displayed.

An object of the invention is to provide a projection display device capable of preventing a burden being placed on eyes of a person who views projection displayed.

Solution to Problem

According to an aspect of the invention, there is provided a projection display device including: a light source that emits a first laser light for displaying a projection and a second laser light for inspection; a drive reflection unit that reflects the first laser light and the second laser light emitted from the light source, and uses the first laser light and the second laser light in scanning; a light diffusion unit that includes a predetermined region that allows the first laser light used in the scanning by the drive reflection unit to be transmitted through the predetermined region, and diffuses the first laser light; a light detection unit that detects the second laser light that passed the predetermined region of the light diffusion unit; and a control unit that executes a process to detect the second laser light, and determines a state of the predetermined region of the light diffusion unit on the basis of a detection value of the light detection unit. In a case where the control unit determines that a defect occurs in the predetermined region of the light diffusion unit as the state of the predetermined region of the light diffusion unit, the control unit executes a process to stop displaying the projection.

In the projection display device, the light detection unit detects the second laser light that passed the predetermined region of the light diffusion unit. Here, "the second laser light that passed the predetermined region of the light diffusion unit" represents the second laser light on which a state of the predetermined region of the light diffusion unit is reflected, such as a second laser light transmitted through the predetermined region of the light diffusion unit. As described above, according to the projection display device, the second laser light that passed the predetermined region of the light diffusion unit is detected, and thus it is possible to determine the state of the predetermined region of the light diffusion unit. In addition, as the state of the predetermined region of the light diffusion unit, in a case where it is determined that a defect occurs in the predetermined region of the light diffusion unit, the process to stop displaying the projection is executed. According to this, displaying the projection is prevented from continuing in a state in which the first laser light is not appropriately diffused due to the defect that occurs in the predetermined region of the light diffusion unit. As a result, according to the projection display device, it is possible to prevent a burden being placed on eyes of a person who views the projection displayed. In addition, by using the drive reflection unit, it is possible to perform scanning with the second laser light for inspection along a scanning line of the first laser light for displaying a projection. According to this, it is possible to efficiently and reliably grasp a detect that occurs on the scanning line (that is, a defect that has an effect on displaying the projection) while permitting a defect that occurs at a position that deviates from the scanning line (that is, a defect that has no effect on displaying the projection) among defects such as a damage that occurs in the predetermined region of the light diffusion unit. As a result, according to the projection display device, particularly, in a case where it is determined that a defect that has an effect on displaying the projection occurs among defects such as the damage that occurs in the predetermined region of the light diffusion unit, the process to stop displaying the projection can be executed.

In the projection display device according to the aspect of the invention, the control unit may execute the process to detect the second laser light during displaying the projection, and in a case where the control unit determines that the defect occurs in the predetermined region of the light diffusion unit, the control unit may execute a process to terminate displaying the projection as the process to stop displaying the projection. According to this, in a case where the defect occurs in the predetermined region of the light diffusion unit during displaying the projection, displaying the projection is immediately terminated, and thus it is possible to prevent a burden from being placed on eyes of a person who views the projection displayed.

In the projection display device according to the aspect of the invention, the control unit may allow the light source to stop emission of the first laser light as the process to terminate displaying the projection. According to this, in a case where the defect occurs in the predetermined region of the light diffusion unit during displaying the projection, it is possible to reliably terminate displaying the projection.

The projection display device according to the aspect of the invention may further include a shutter that is capable of advancing and retreating on an optical path of the first laser light used in the scanning by the drive reflection unit, or on an optical path of the first laser light transmitted through the predetermined region of the light diffusion unit. The control unit may dispose the shutter on the optical path of the first laser light as the process to terminate displaying the projection. According to this, in a case where the defect occurs in the predetermined region of the light diffusion unit during displaying the projection, it is possible to reliably terminate displaying the projection.

In the projection display device according to the aspect of the invention, the control unit may execute the process to detect the second laser light at least one of before displaying the projection and after displaying the projection, and in a case where the control unit determines that a defect occurs in the predetermined region of the light diffusion unit, the control unit may execute a process to prohibit initiating displaying the projection as the process to stop displaying the projection. According to this, it is possible to prohibit displaying the projection from being initiated by the predetermined region of the light diffusion unit, and it is possible to prevent a burden from being placed on eyes of a person who views the projection displayed.

The projection display device according to the aspect of the invention may further include a light selection unit that allows the first laser light to be transmitted through the light selection unit and reflects the second laser light at a position on an incident surface of the light diffusion unit in the predetermined region, at a position on an emission surface of the light diffusion unit in the predetermined region, or at a position that is distant from the emission surface toward an emission side of the light diffusion unit. The light detection unit may detect the second laser light reflected by the light selection unit. According to this, since the optical path of the first laser light and the optical path of the second laser light can be divided, it is possible to increase the degree of freedom of a position at which the light detection unit is disposed.

In the projection display device according to the aspect of the invention, the light detection unit may detect the second laser light that proceeds outside of the optical path of the first laser light in the second laser light transmitted through the predetermined region of the light diffusion unit and diffused by the predetermined region. According to this, an optical member that divides the optical path of the first laser light and the optical path of the second laser light is not necessary, and thus it is possible to realize the projection display device with a simple configuration.

The projection display device according to the aspect of the invention may further include a light selection unit that reflects the first laser light transmitted through the predetermined region of the light diffusion unit, and allows the second laser light transmitted through the predetermined region of the light diffusion unit to be transmitted through the light selection unit. The light detection unit may detect the second laser light transmitted through the light selection unit. According to this, since the optical path of the first laser light and the optical path of the second laser light can be divided, it is possible to increase the degree of freedom of a position at which the light detection unit is disposed.

Advantageous Effects of Invention

According to the invention, it is possible to provide a projection display device capable of preventing a burden from being placed on eyes of a person who views projection displayed.

DESCRIPTION OF EMBODIMENTS

Figure 1:
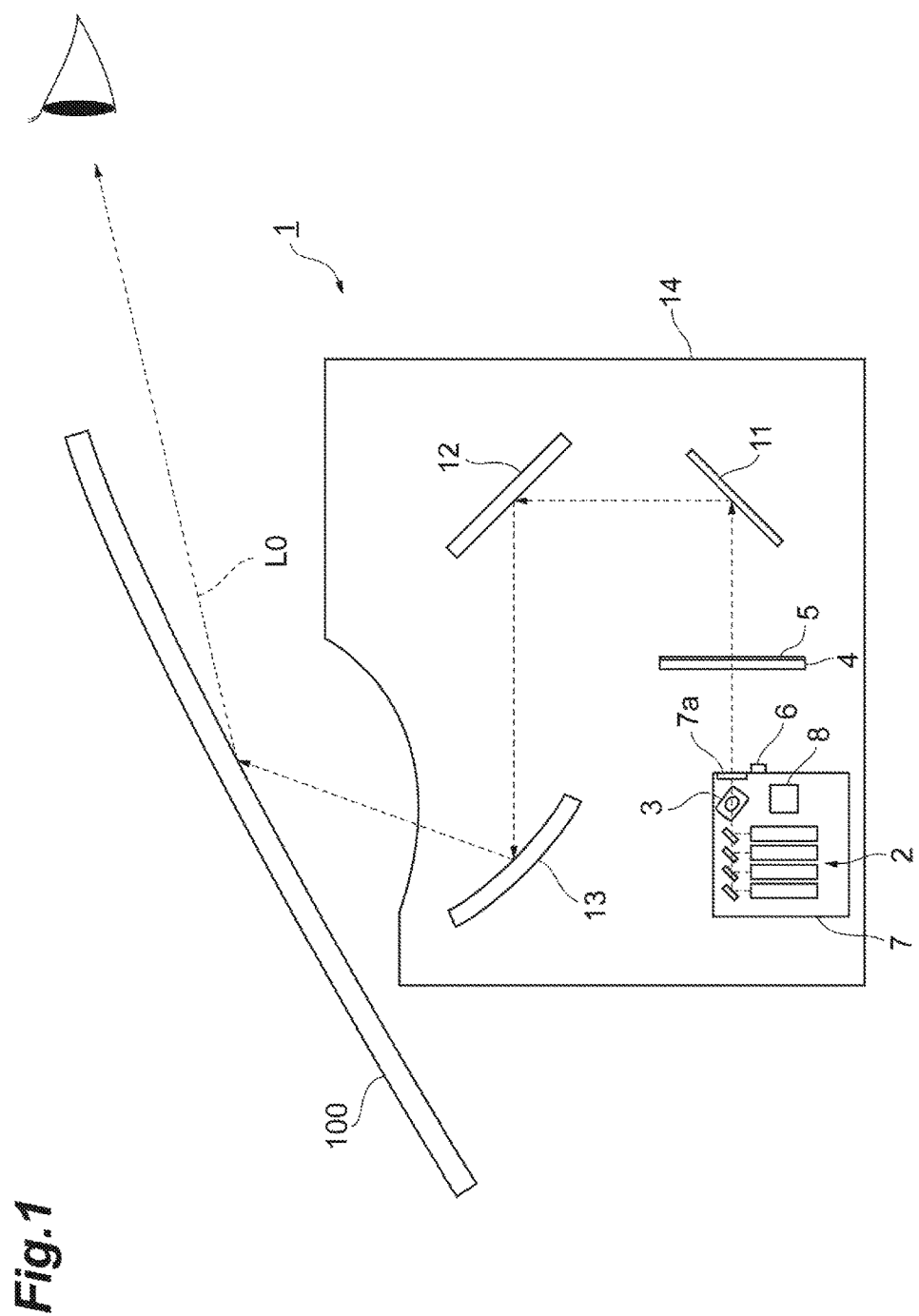
FIG. 1 is a schematic view of a projection display device according a first embodiment.

Hereinafter, embodiments of the invention will be described in detail with reference to the accompanying drawings. Furthermore, the same reference numeral will be given to the same or corresponding portion in respective drawings, and redundant description will be omitted.

First Embodiment

As illustrated in FIG. 1, a projection display device 1 includes a light source 2, a scanning drive mirror (drive reflection unit) 3, a light diffusion unit 4, a light selection unit 5, and a light detection unit 6. For example, the projection display device 1 is a laser scanning type projection display that is mounted on a vehicle, and displays an image by projection on a front glass 100 of the vehicle. The light source 2 emits a first laser light L1 for displaying a projection and a second laser light L2 for inspection. The scanning drive mirror 3 reflects the first laser light L1 and the second laser light L2 emitted from the light source 2, and scans a predetermined region of the light diffusion unit 4 with the first laser light L1 and the second laser light L2. The light diffusion unit 4 allows the first laser light L1 used in the scanning by the scanning drive mirror 3 to be transmitted therethrough, and diffuses the first laser light L1. At a position on an emission surface of the light diffusion unit 4, the light selection unit 5 allows the first laser light L1 to be transmitted therethrough, and reflects the second laser light L2. The light detection unit 6 detects the second laser light L2 that is reflected by the light selection unit 5.

The projection display device 1 further includes planar mirrors 11 and 12, a concave mirror 13, and a body 14. The planar mirrors 11 and 12, and the concave mirror 13 guide a light L0 (that is, a light that constitutes a video in the first laser light L1 diffused in the predetermined region of the light diffusion unit 4) for displaying a projection to the front glass 100 of the vehicle. The body 14 accommodates respective units that constitute the projection display device 1.

Figure 2:
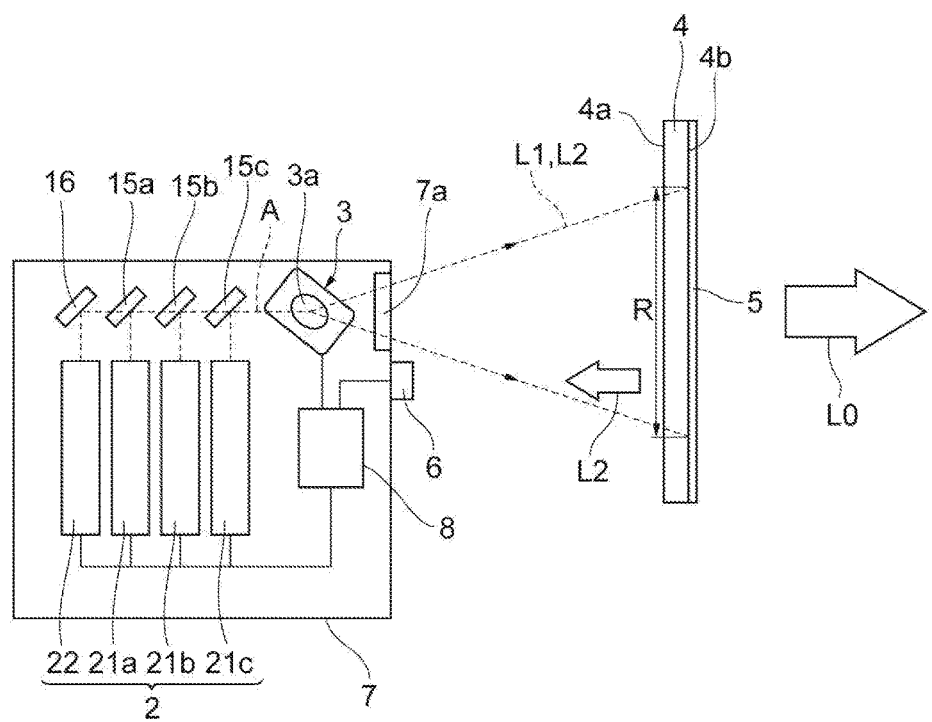
FIG. 2 is a schematic view of a part of the projection display device according to the first embodiment.

As illustrated in FIG. 2, the light source 2 includes a plurality of first emission units 21a, 21b, and 21c, and a second emission unit 22. For example, the first emission units 21a, 21b, and 21c are a red laser diode, a green laser diode, and a blue laser diode, and emit the first laser light L1 for displaying a projection. A wavelength region of the first laser light L1 emitted from each of the first emission units 21a, 21b, and 21c is a visible region. For example, the second emission unit 22 is an infrared laser diode, and emits the second laser light L2 for inspection for grasping a state of the predetermined region of the light diffusion unit 4. A wavelength region of the second laser light L2 emitted from the second emission unit 22 is an infrared region. In this manner, the wavelength region of the first laser light L1 and the wavelength region of the second laser light L2 deviate from each other.

The first laser light L1 emitted from the first emission unit 21c is reflected by a mirror 15c, proceeds along an optical path A, and reaches the scanning drive mirror 3. The first laser light L1 emitted from the first emission unit 21b is reflected by a mirror 15b, proceeds along the optical path A, is transmitted through the mirror 15c, and reaches the scanning drive mirror 3. The first laser light L1 emitted from the first emission unit 21a is reflected by a mirror 15a, proceeds along the optical path A, is transmitted through the mirrors 15b and 15c, and reaches the scanning drive mirror 3. The second laser light L2 emitted from the second emission unit 22 is reflected by a mirror 16, proceeds along the optical path A, is transmitted through the mirrors 15a, 15b, and 15c, and reaches the scanning drive mirror 3. For example, the mirrors 15a, 15b, and 15c are dichroic mirrors.

Figure 3:
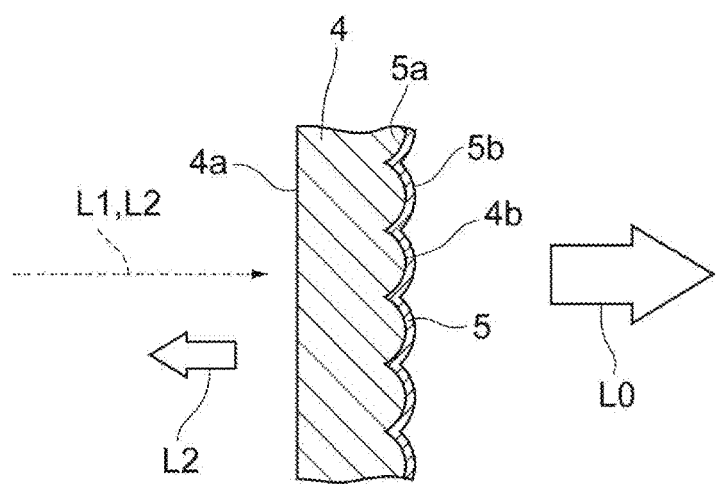
FIG. 3 is a cross-sectional view of a light diffusion unit and a light selection unit of the projection display device according to the first embodiment.

The scanning drive mirror 3 is disposed on the optical path A. For example, the scanning drive mirror 3 is an electromagnetic drive type optical mirror that is manufactured according to a MEMS (Micro Electromechanical Systems) technology. The scanning drive mirror 3 reflects the first laser light L1 and the second laser light L2 that proceed along the optical path A, by swing the mirror 3a, and scans the predetermined region R of the light diffusion unit 4 with the first laser light L1 and the second laser light L2 projection display devices As illustrated in FIG. 3, the light diffusion unit 4 is disposed on an extended line of the optical path A. For example, the light diffusion unit 4 is a microlens array including a plurality of microlenses arranged in a matrix shape, and allows the first laser light L1 for displaying a projection used in the scanning by the scanning drive mirror 3 to be transmitted therethrough, and diffuses the first laser light L1. An incident surface 4a of the light diffusion unit 4 is configured as a flat surface. An emission surface 4b of the light diffusion unit 4 is constituted by a plurality of convex surfaces corresponding to the plurality of microlenses.

The light selection unit 5 is formed on the emission surface 4b of the light diffusion unit 4 in such a manner that a surface 5a on a light diffusion unit 4 side and a surface 5b opposite to the surface 5a conform to the plurality of convex surfaces in the emission surface 4b of the light diffusion unit 4. For example, the light selection unit 5 is a light selection film that is coated on the emission surface 4b of the light diffusion unit 4, and has a function of allowing a light having a wavelength region of the first laser light L1 for displaying a projection to be transmitted therethrough and of reflecting a light having a wavelength region of the second laser light L2 for inspection. The light selection unit 5 is provided at least in the predetermined region R that is scanned with the first laser light L1, in the emission surface 4b of the light diffusion unit 4.

As illustrated in FIG. 2, the light detection unit 6 is disposed at a position capable of detecting the second laser light L2 for inspection that is reflected by the light selection unit 5. For example, the light detection unit 6 is an infrared detector.

The projection display device 1 further includes a body 7. The body 7 accommodates the light source 2, the mirrors 15a, 15b, 15c, and 16, and the scanning drive mirror 3. The body 7 is provided with a window 7a through which the first laser light L1 and the second laser light L2 used in the scanning by the scanning drive mirror 3 are emitted to the outside. Furthermore, the light detection unit 6 is formed on an outer surface of the body 7 to face the light diffusion unit 4. That is, the light detection unit 6 is disposed between the scanning drive mirror 3 and the light diffusion unit 4 in a direction in which the scanning drive mirror 3 and the light diffusion unit 4 face each other. In this manner, the light detection unit 6 is disposed on an outer side of the body 7.

The projection display device 1 further includes a control unit 8. The control unit 8 is constituted by a CPU (Central Processing Unit), a ROM (Read Only Memory), a RAM (Random Access Memory), and the like, and control respective units of the projection display device 1. The control unit 8 executes a process to display the projection, a process to detect the second laser light L2, and a process to terminate displaying the projection. Furthermore, the control unit 8 may be accommodated in the body 7, or may be disposed on an outer side of the body 7.

Figure 4:
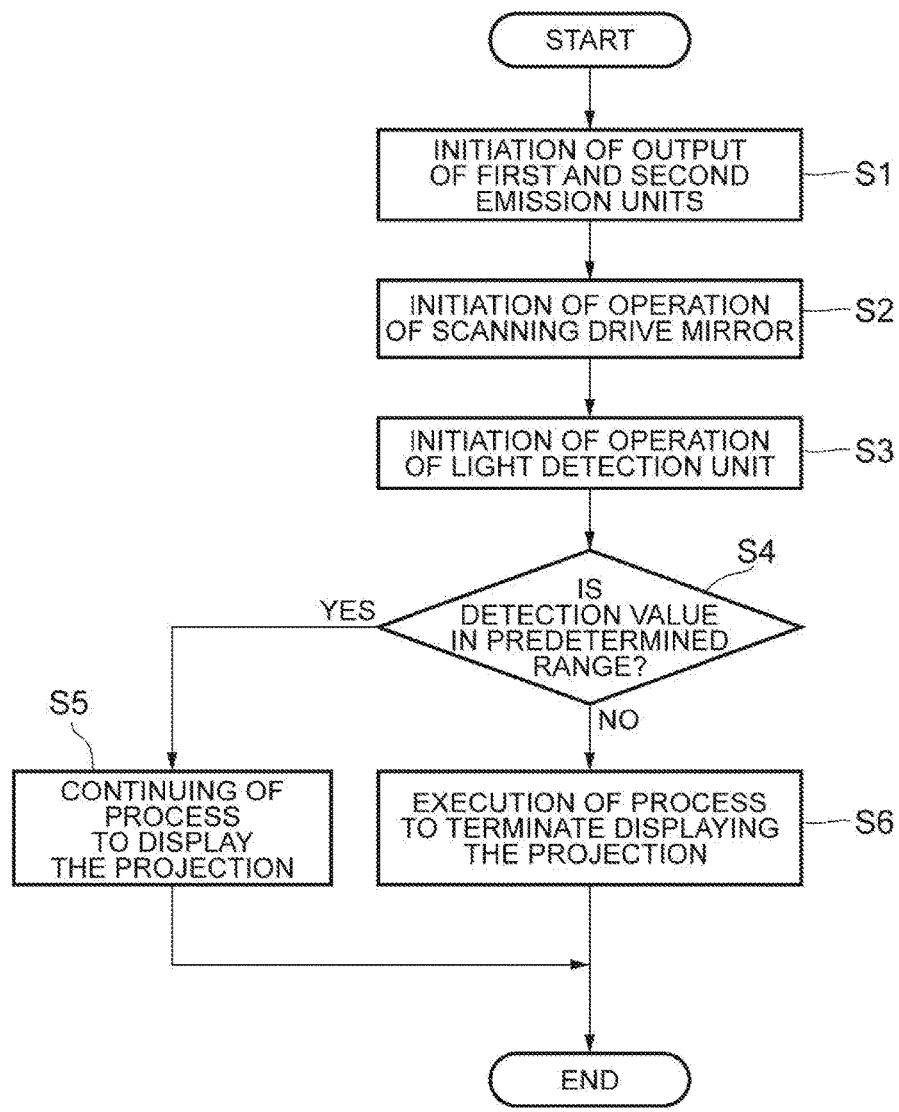
FIG. 4 is a flowchart illustrating an example of a process executed by a control unit of the projection display device according to the first embodiment.

Description will be given of an example of a process executed by the control unit 8 (an example in which the process to detect the second laser light L2 is executed during displaying the projection) with reference to FIG. 4.

First, when receiving an input signal to initiate displaying a projection, the control unit 8 initiates output of each of the plurality of first emission units 21a, 21b, and 21c, and the second emission unit 22 (step S1). According to this, the first laser light L1 and the second laser light L2 are emitted from the plurality of first emission units 21a, 21b, and 21c, and the second emission unit 22.

The control unit 8 initiates an operation of the scanning drive mirror 3 approximately simultaneously with step S1 (step S2), and the control unit 8 initiates an operation of the light detection unit 6 approximately simultaneously with steps S1 and S2 (step S3). According to this, in the scanning drive mirror 3, swinging of the mirror 3a is initiated, and the predetermined region R of the light diffusion unit 4 is scanned with the first laser light L1 and the second laser light L2 emitted from the light source 2.

At this time, a ratio of the first laser light L1 for displaying a projection that is emitted from the first emission units 21a, 21b, and 21c can vary in correspondence with a scanning position with the first laser light L1 in the predetermined region R of the light diffusion unit 4. According to this, a light L0 (that is, a light that constitutes a video in the first laser light L1 diffused in the predetermined region R of the light diffusion unit 4) for displaying a projection is guided to the front glass 100 of the vehicle by the planar mirrors 11 and 12 and the concave mirror 13, and reaches eyes of a driver as a video after reflection from the front glass 100 of the vehicle.

On the other hand, the second laser light L2 for inspection used in the scanning by the scanning drive mirror 3 is diffused by the predetermined region R of the light diffusion unit 4, and is reflected by the light selection unit 5. The second laser light L2 reflected by the light selection unit 5 is transmitted again through the light diffusion unit 4 and is detected by the light detection unit 6.

Here, the control unit 8 receives a detection value related to an optical quantity of the second laser light L2 from the light detection unit 6. The detection value is correlated to a scanning position of the second laser light L2 in the predetermined region R of the light diffusion unit 4. In addition, the control unit 8 determines a state of the predetermined region R of the light diffusion unit 4 on the basis of the detection value (step S4). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of the predetermined region R of the light diffusion unit 4 is normal, and continues the process to display the projection (step S5).

On the other hand, in a case where the detection value is out of the predetermined range from the reference value, the control unit 8 determines that a defect occurs in the predetermined region R of the light diffusion unit 4 as the state of the predetermined region R of the light diffusion unit 4, and executes a process to terminate displaying the projection (step S6). The control unit 8 allows the first emission units 21a, 21b, and 21c to stop emission of the first laser light L1 as the process to terminate displaying the projection that is an example of a process to stop displaying the projection. According to this, displaying the projection is compulsorily terminated. In this manner, the control unit 8 grasps the defect in correlation with the scanning position of the second laser light L2 in the predetermined region R of the light diffusion unit 4. That is, the control unit 8 grasps whether or not a defect occurs in the predetermined region R of the light diffusion unit 4, and grasps a position in the predetermined region R at which the defect occurs in a case where the defect occurs in the predetermined region R of the light diffusion unit 4.

As described above, in the projection display device 1, the light selection unit 5 reflects the second laser light L2 for inspection at a position on the emission surface 4b of the light diffusion unit 4 in the predetermined region R. Accordingly, a state of the predetermined region R is reflected on the second laser light L2 reflected by the light selection unit 5. As a result, according to the projection display device 1, it is possible to determine the state of the predetermined region R of the light diffusion unit 4 by detecting the second laser light L2 reflected by the light selection unit 5. In addition, in a case where it is determined that a defect occurs in the predetermined region R of the light diffusion unit 4 as the state of the predetermined region R, the process to terminate displaying the projection is executed as the process to stop displaying the projection. According to this, displaying the projection is prevented from continuing in a state in which the first laser light L1 is not appropriately diffused due to the defect that occurs in the predetermined region R of the light diffusion unit 4. Accordingly, according to the projection display device 1, it is possible to prevent a burden being placed on eyes of a person who views the projection displayed. In addition, when using the scanning drive mirror 3, it is possible to perform scanning with the second laser light L2 for inspection along a scanning line of the first laser light L1 for displaying a projection. Particularly, since the same scanning drive mirror 3 is used, it is possible to perform scanning with the second laser light L2 for inspection on the same scanning line as that of the first laser light L1 for displaying a projection. According to this, it is possible to efficiently and reliably grasp a detect that occurs on the scanning line (that is, a defect that has an effect on displaying the projection) while permitting a defect that occurs at a position that deviates from the scanning line (that is, a defect that has no effect on displaying the projection) among defects such as a damage that occurs in the predetermined region R of the light diffusion unit 4. As a result, according to the projection display device 1, among defects such as the damage that occurs in the predetermined region R of the light diffusion unit 4, particularly, in a case where it is determined that a defect that has an effect on displaying the projection occurs, the process to stop displaying the projection can be executed.

In addition, the control unit 8 executes a process to detect the second laser light L2 during displaying the projection, and in a case where the control unit 8 determines that a defect occurs in the predetermined region R of the light diffusion unit 4, the control unit 8 executes the process to terminate displaying the projection as the process to stop displaying the projection. According to this, in a case where a defect occurs in the predetermined region R of the light diffusion unit 4 during displaying the projection, displaying the projection is immediately terminated, and thus it is possible to immediately prevent a burden being placed on eyes of a person who views the projection displayed.

In addition, the control unit 8 allows the light source 2 to stop emission of the first laser light L1 as the process to terminate displaying the projection. According to this, in a case where a defect occurs in the predetermined region R of the light diffusion unit 4 during displaying the projection, it is possible to reliably terminate displaying the projection.

In addition, the projection display device 1 includes the light selection unit 5 that allows the first laser light L1 to be transmitted therethrough and reflects the second laser light L2 at a position on the emission surface 4b of the light diffusion unit 4 in the predetermined region R. In addition, the light detection unit 6 detects the second laser light L2 that is reflected by the light selection unit 5. According to this, since the optical path of the first laser light L1 and the optical path of the second laser light L2 can be divided, it is possible to increase the degree of freedom of a position at which the light detection unit 6 is disposed.

Second Embodiment

Figure 5:
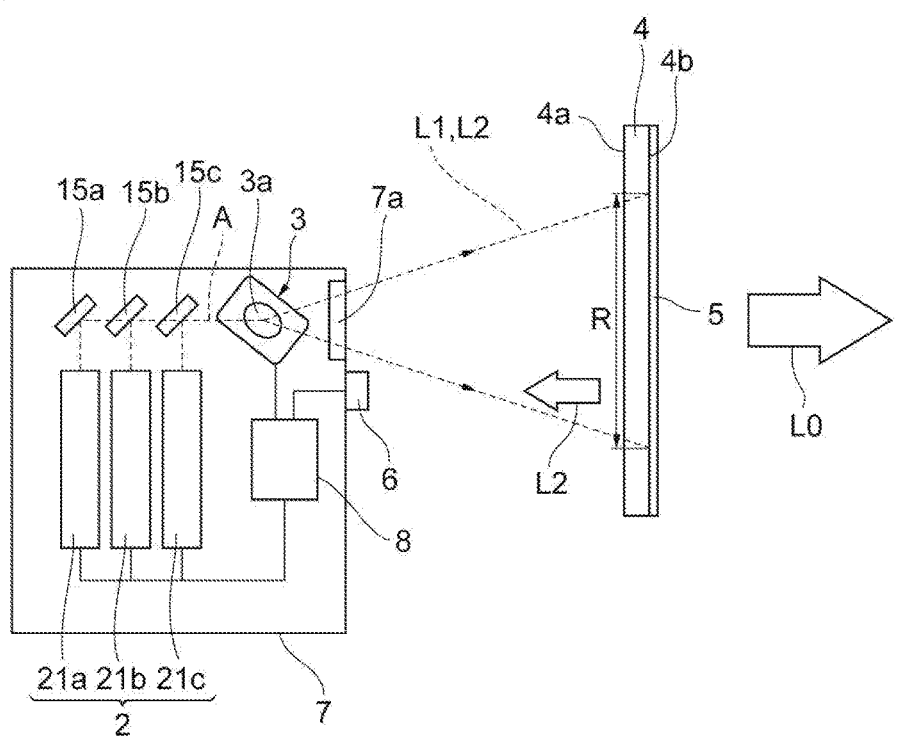
FIG. 5 is a schematic view of a part of a projection display device according to a second embodiment.

A projection display device 1 according to a second embodiment is different from the projection display device 1 according to the first embodiment in the configuration of the light source 2 and the light selection unit 5. As illustrated in FIG. 5, the light source 2 is not provided with the second emission unit 22. In addition, the light selection unit 5 is an optical member having a function of allowing a part of laser light emitted from any one of the first emission units 21a, 21b, and 21c to be transmitted therethrough as the first laser light L1 for displaying a projection, and of reflecting the remainder of the laser light as the second laser light L2 for inspection.

For example, a part of laser light emitted from the first emission unit 21c that is a blue laser diode is used as the first laser light L1 for displaying a projection, and the remainder of the laser light is used as the second laser light L2 for inspection. The reason for this is because a blue laser diode can emit an optical quantity greater than an optical quantity necessary for displaying the projection in comparison to a red laser diode and a green laser diode.

In this manner, in the projection display device 1 according to the second embodiment, a wavelength region of the first laser light L1 and a wavelength region of the second laser light L2 overlap each other. In addition, the wavelength region of the first laser light L1 and the wavelength region of the second laser light L2 are visible regions.

Even in the projection display device 1 according to the second embodiment, as is the case with the projection display device 1 according to the first embodiment, the process to display the projection, the process to detect the second laser light L2, and the process to terminate displaying the projection are executed by the control unit 8. As a result, according to the projection display device 1 of the second embodiment, it is also possible to prevent a burden from being placed on eyes of a person who views the projection displayed.

In addition, in the light source 2 of the projection display device 1 according to the second embodiment, any one of the first emission units 21a, 21b, and 21c emits laser light including the first laser light L1 and the second laser light L2. According to this, the second emission unit 22 that dedicatedly emits the second laser light L2 for inspection is not necessary, and thus it is possible to realize the light source 2 with a simple configuration.

Third Embodiment

Figure 6:
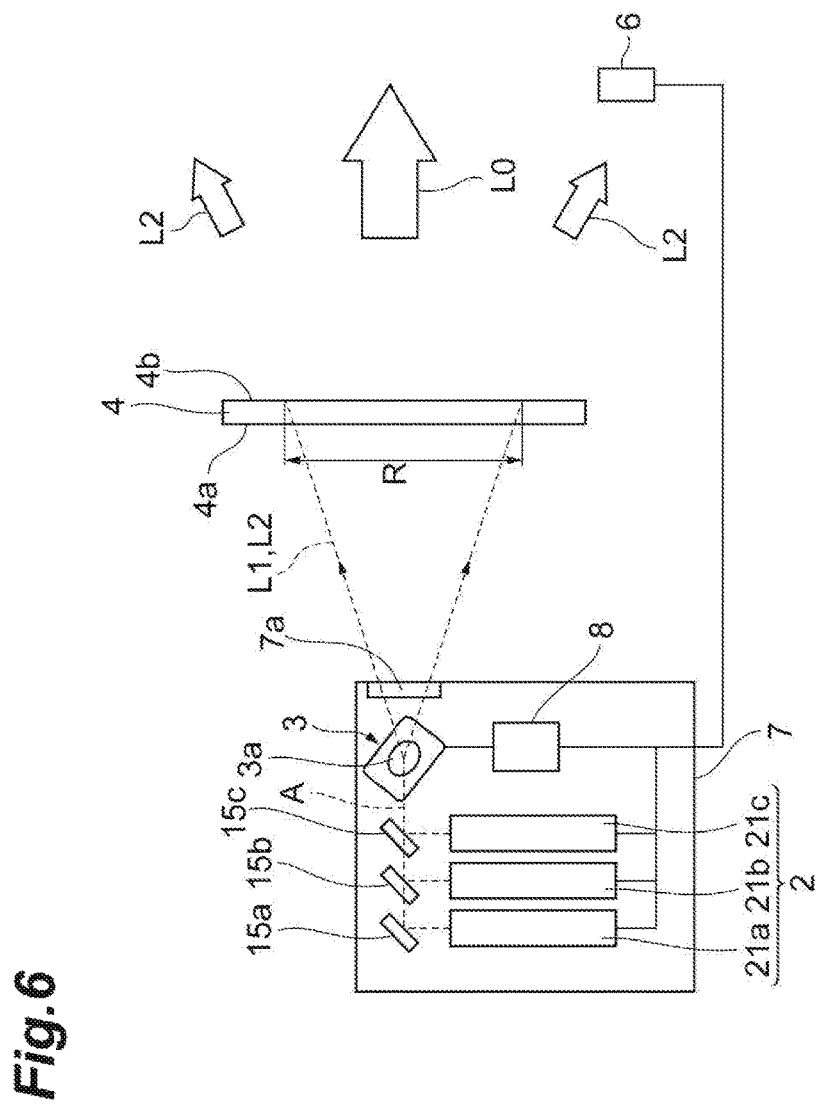
FIG. 6 is a schematic view of a part of a projection display device according to a third embodiment.

A projection display device 1 according to a third embodiment is different from the projection display device 1 according to the second embodiment in that the light selection unit 5 is not provided, and the light detection unit 6 is disposed on a side opposite to the light source 2 on the basis of the light diffusion unit 4. As illustrated in FIG. 6, the projection display device 1 according to the third embodiment is not provided with the light selection unit 5. In addition, the light detection unit 6 is disposed to avoid the optical path of the light L0 for displaying a projection on the emission side of the light diffusion unit 4.

Laser light respectively emitted from the plurality of the first emission units 21a, 21b, and 21c is used to scan the predetermined region R of the light diffusion unit 4, and is transmitted through the predetermined region R of the light diffusion unit 4 and is diffused. The first laser light L1 that is a part of the laser light diffused in the predetermined region R of the light diffusion unit 4 reaches eyes of a driver as a light L0 for displaying a projection. On the other hand, the second laser light L2 that is the remainder of the laser light diffused in the predetermined region R of the light diffusion unit 4 proceeds outside of the optical path of the first laser light L1 (light L0 for displaying a projection) as a light for inspection and is detected by the light detection unit 6. The light detection unit 6 is disposed at a position capable of detecting the second laser light L2 even when any position in the predetermined region R is scanned with the laser light emitted from the light source 2.

In this manner, in the projection display device 1 according to the third embodiment, the first laser light L1 that is a part of the laser light respectively emitted from the plurality of first emission units 21a, 21b, and 21c are used as a light L0 for displaying a projection, and the second laser light L2 that is the remainder of the laser light is used as a light for inspection.

Even in the projection display device 1 according to the third embodiment, as is the case with the projection display device 1 according to the first embodiment, the process to display the projection, the process to detect the second laser light L2, and the process to terminate displaying the projection are executed by the control unit 8. As a result, according to the projection display device 1 of the third embodiment, it is also possible to prevent a burden from being placed on eyes of a person who views the projection displayed.

In addition, in the projection display device 1 according to the third embodiment, the light detection unit 6 detects the second laser light L2 that proceeds outside of the optical path of the first laser light L1 in the second laser light L2 transmitted through the predetermined region R of the light diffusion unit 4 and diffused by the predetermined region 4. According to this, an optical member that divides the optical path of the first laser light L1 and the optical path of the second laser light L2 is not necessary, and thus it is possible to realize the projection display device 1 with a simple configuration.

Furthermore, as a modification example of the projection display device 1 according to the third embodiment, as is the case with the projection display device 1 according to the first embodiment, the light source 2 may include the plurality of the first emission units 21a, 21b, and 21c, and the second emission unit 22. In this case, for example, the first emission units 21a, 21b, and 21c are a red laser diode, a green laser diode, and a blue laser diode, and emit the first laser light L1 for displaying a projection. A wavelength region of the laser light emitted from the first emission units 21a, 21b, and 21c is a visible region. For example, the second emission unit 22 is an infrared laser diode, and emits the second laser light L2 for inspection for grasping a state of the predetermined region R of the light diffusion unit 4. A wavelength region of the laser light emitted from the second emission unit 22 is an infrared region.

First laser light L1 respectively emitted from the plurality of first emission units 21a, 21b, and 21c is used to scan the predetermined region R of the light diffusion unit 4, and is transmitted through the predetermined region R of the light diffusion unit 4 and is diffused. The first laser light L1 diffused in the predetermined region R of the light diffusion unit 4 reaches eyes of a driver as a light L0 for displaying a projection. On the other hand, second laser light L2 emitted from the second emission unit 22 is used to scan the predetermined region R of the light diffusion unit 4, and is transmitted through the predetermined region R of the light diffusion unit 4 and is diffused. A part of the second laser light L2 diffused in the predetermined region R of the light diffusion unit 4 proceeds outside of the optical path of the first laser light L1 and is detected by the light detection unit 6.

Fourth Embodiment

Figure 7:
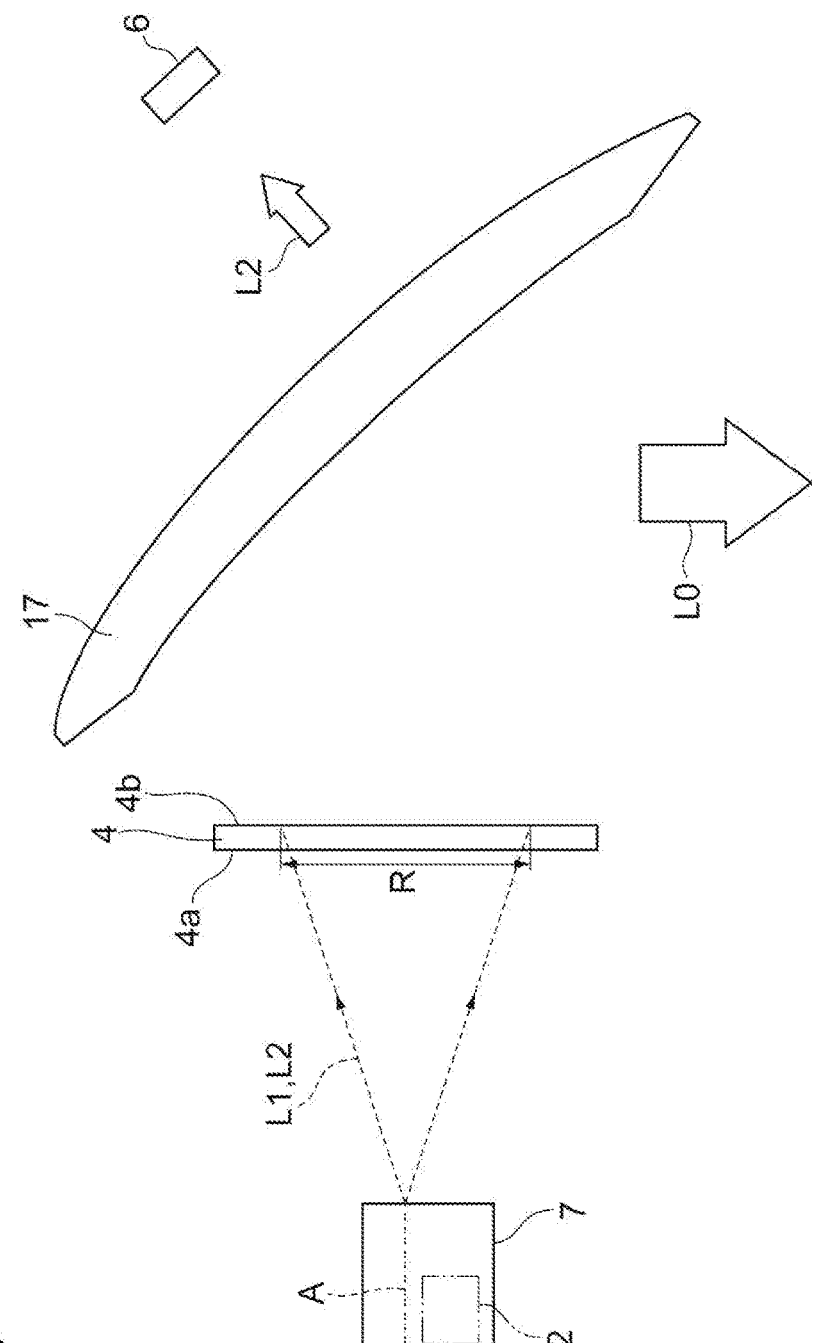
FIG. 7 is a schematic view of a part of a projection display device according to a fourth embodiment.

A projection display device 1 according to a fourth embodiment is different from the projection display device 1 according to the second embodiment in that a light selection unit 17 is provided instead of the light selection unit 5, and the light detection unit 6 detects a second laser light L2 that is transmitted through the predetermined region R of the light diffusion unit 4 and the light selection unit 17. As illustrated in FIG. 7, the light selection unit 17 is disposed on a side opposite to the light source 2 on the basis of the light diffusion unit 4. More specifically, the light selection unit 17 is disposed at a position that is distant from the emission surface 4b of the light diffusion unit 4 toward an emission side of the light diffusion unit 4. The light selection unit 17 has a function of reflecting a part of laser light diffused in the predetermined region R of the light diffusion unit 4 and of allowing the remainder of the laser light to be transmitted therethrough. The light detection unit 6 is disposed on a side opposite to the light diffusion unit 4 on the basis of the light selection unit 17. The light detection unit 6 detects a laser light that is diffused in the predetermined region R of the light diffusion unit 4 and is transmitted through the light selection unit 17.

Laser light emitted from the plurality of first emission units 21a, 21b, and 21c is used to scan the predetermined region R of the light diffusion unit 4, and is transmitted through the predetermined region R of the light diffusion unit 4 and is diffused. The first laser light L1 that is a part of the laser light diffused in the predetermined region R of the light diffusion unit 4 is reflected by the light selection unit 17, and reaches eyes of a driver as a light L0 for displaying a projection. On the other hand, the second laser light L2 that is the remainder of the laser light diffused in the predetermined region R of the light diffusion unit 4 is transmitted through the light selection unit 17, and is detected by the light detection unit 6 as a light for inspection.

In this manner, in the projection display device 1 according to the fourth embodiment, the first laser light L1 that is a part of the laser light emitted from the plurality of first emission units 21a, 21b, and 21c is used as the light L0 for displaying a projection, and the second laser light L2 that is the remainder of the laser light is used as a light for inspection.

Even in the projection display device 1 according to the fourth embodiment, as is the case with the projection display device 1 according to the first embodiment, the process to display the projection, the process to detect the second laser light L2, and the process to terminate displaying the projection are executed by the control unit 8. As a result, according to the projection display device 1 of the fourth embodiment, it is also possible to prevent a burden from being placed on eyes of a person who views the projection displayed.

In addition, the projection display device 1 according to the fourth embodiment includes the light selection unit 17 that reflects the first laser light L1 and allows the second laser light L2 to be transmitted therethrough at a position that is distant from emission surface 4b of the light diffusion unit 4 toward the emission side of the light diffusion unit 4. In addition, the light detection unit 6 detects the second laser light L2 that is transmitted through the light selection unit 17. According to this, since the optical path of the first laser light L1 and the optical path of the second laser light L2 can be divided, it is possible to increase the degree of freedom of a position at which the light detection unit 6 is disposed.

Furthermore, as a modification example of the projection display device 1 according to the fourth embodiment, as is the case with the projection display device 1 according to the first embodiment, the light source 2 may include the plurality of the first emission units 21a, 21b, and 21c, and the second emission unit 22. In this case, for example, the first emission units 21a, 21b, and 21c are a red laser diode, a green laser diode, and a blue laser diode, and emit the first laser light L1 for displaying a projection. A wavelength region of the laser light emitted from the first emission units 21a, 21b, and 21c is a visible region. For example, the second emission unit 22 is an infrared laser diode, and emits the second laser light L2 for inspection for grasping a state of the predetermined region R of the light diffusion unit 4. A wavelength region of the laser light emitted from the second emission unit 22 is an infrared region.

First laser light L1 respectively emitted from each of the plurality of first emission units 21a, 21b, and 21c is used to scan the predetermined region R of the light diffusion unit 4, and is transmitted through the predetermined region R of the light diffusion unit 4 and is diffused. The first laser light L1 diffused in the predetermined region R of the light diffusion unit 4 is reflected by the light selection unit 17 and reaches eyes of a driver as a light L0 for displaying a projection. On the other hand, second laser light L2 emitted from the second emission unit 22 is used to scan the predetermined region R of the light diffusion unit 4, and is transmitted through the predetermined region R of the light diffusion unit 4 and is diffused. A part of the second laser light L2 diffused in the predetermined region R of the light diffusion unit 4 is transmitted through the light selection unit 17 and is detected by the light detection unit 6.

Hereinbefore, the first to fourth embodiments of the invention have been described, but the invention is not limited to the embodiments.

For example, the scanning drive mirror 3 may be a galvano mirror without limitation to the electromagnetic drive type optical mirror that is manufactured according to an MEMS technology. In addition, with regard to a drive method, other methods such as an electrostatic drive method, a piezoelectric drive method, a thermal drive method may be employed without limitation to the electromagnetic drive type. In addition, the projection display device 1 may be respectively provided with the scanning drive mirror 3 for the first laser light L1 and the scanning drive mirror 3 for the second laser light L2.

In addition, the light diffusion unit 4 is not limited to the microlens array as long as the light diffusion unit 4 is constituted by an optical member having a function of diffusing a light. As an example, a frost type diffusion plate, an opal type diffusion plate, and the like can be used as the light diffusion unit 4.

In addition, in the projection display device 1 according to the first and second embodiments, the light selection unit 5 is provided at a position on the emission surface 4b of the light diffusion unit 4 in the predetermined region R. However, the light selection unit 5 may be provided, for example, at a position distant from the emission surface 4b of the light diffusion unit 4 toward the emission side of the light diffusion unit 4 without limitation to the position on the emission surface 4b of the light diffusion unit 4 in the predetermined region R. Even in any of a case where the light selection unit 5 is provided at a position on the emission surface 4b of the light diffusion unit 4 in the predetermined region R, and a case where the light selection unit 5 is provided at a position distant from the emission surface 4b of the light diffusion unit 4 toward the emission side of the light diffusion unit 4, a state of the incident surface 4a and the emission surface 4b of the light diffusion unit 4 in the predetermined region R, and an internal state of the light diffusion unit 4 in the predetermined region R are reflected on the second laser light L2 that is reflected by the light selection unit 5.

In addition, the light selection unit 5 may be provided at a position on the incident surface 4a of the light diffusion unit 4 in the predetermined region R. In this case, a state of the incident surface 4a of the light diffusion unit 4 in the predetermined region R is reflected on the second laser light L2 that is reflected by the light selection unit 5. On the other hand, in this case, it is preferable that the light selection unit 5 is an optical member having a function of diffusing the second laser light L2 in addition to the function of reflecting the second laser light L2. According to this, even when any position in the predetermined region R is scanned with the second laser light L2, it is possible to grasp a defect that occurs on the incident surface 4a of the light diffusion unit 4 in the predetermined region R.

In this manner, in the projection display device according to an aspect of the invention, any configuration may be employed as long as the light detection unit can detect the second laser light that passed the predetermined region of the light diffusion unit. Here, for example, "the second laser light that passed the predetermined region of the light diffusion unit" represents the second laser light on which a state of the predetermined region of the light diffusion unit is reflected, such as a second laser light L2 transmitted through the predetermined region R of the light diffusion unit 4 Accordingly, the light selection unit 5 may be disposed at any position as long as the state of the predetermined region R of the light diffusion unit 4 is reflected on the second laser light L2 that is detected by the light detection unit 6. In addition, as is the case with the third embodiment, the light selection unit 5 may not be provided. That is, in the projection display device according to an aspect of the invention, any configuration may be employed regardless of presence or absence of the light selection unit 5 and the like as long as the light detection unit 6 can detect the second laser light L2 that passed the predetermined region R of the light diffusion unit 4.

In addition, in the projection display device 1 according to the first and second embodiment, the light detection unit 6 is disposed on an outer side of the body 7, but the light detection unit 6 may be disposed on an inner side of the body 7. According to this, it is possible to protect the light detection unit 6.

Figure 8:
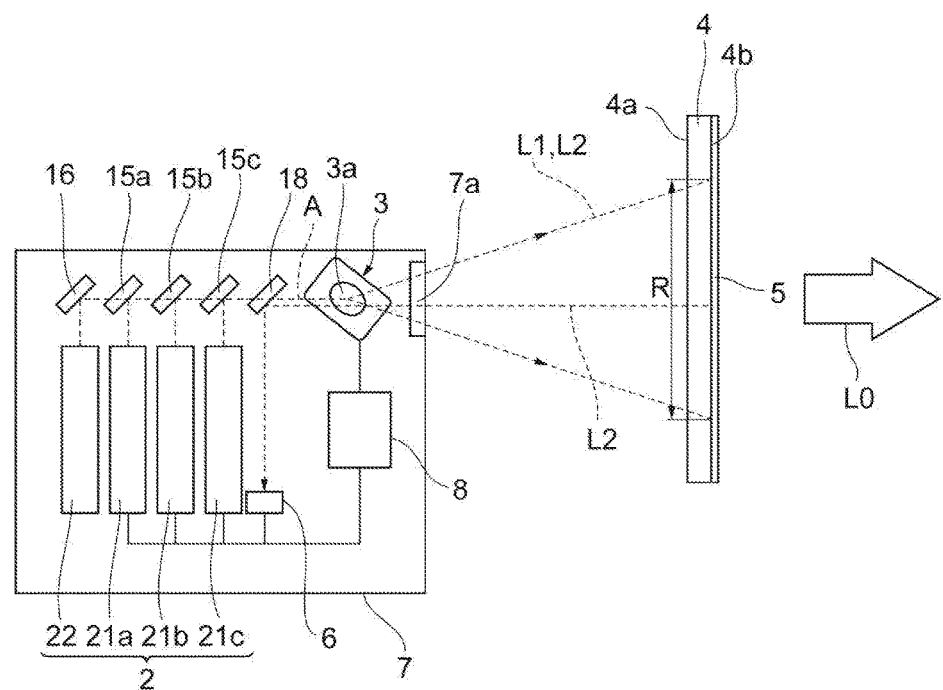
FIG. 8 is a schematic view of a modification example of a part of the projection display devices according to the first to fourth embodiments.

Specifically, as illustrated in FIG. 8, a mirror 18 may be disposed between the mirror 15c and the scanning drive mirror 3 on the optical path A, and the light detection unit 6 may be disposed in the body 7 to face the mirror 18. Here, for example, the mirror 18 is a mirror provided with a through-hole that is formed on the optical path A. According to this, the first laser light L1 and the second laser light L2 that proceed along the optical path A toward the scanning drive mirror 3 pass through the through-hole of the mirror 18. On the other hand, the second laser light L2 that returned again to the inside of the body 7 is reflected by the mirror 18 and is detected by the light detection unit 6. The second laser light L2 that returned again to the inside of the body 7 is diffused by the predetermined region R of the light diffusion unit 4, and thus optical axes of the first laser light L1 and the second laser light L2 that proceed toward the scanning drive mirror 3 deviate from each other. According to this, the second laser light L2 that returned again to the inside of the body 7 is reflected at a portion of the mirror 18 other than the through-hole. The mirror 18 as described above may be disposed between the mirror 15a and the mirror 15b or between the mirror 15b and the mirror 15c on the optical path A. However, when the mirror 18 is disposed between the mirror 15c and the scanning drive mirror 3, it is possible to sufficiently secure an optical quantity of the second laser light L2 in the light detection unit 6 in comparison to cases where the mirror 18 is disposed at other positions. As a result, it is possible to reliably grasp a defect such as a damage that occurs in the predetermined region R of the light diffusion unit 4.

In addition, the light detection unit 6 may be disposed at a position that faces the window 7a on an inner side of the body 7 (refer to FIG. 2 and FIG. 5). In this case, the light detection unit 6 can reliably detect a second laser light L2 that is transmitted from the window 7a, in second laser light L2 reflected by the light selection unit 5.

In addition, the light detection unit 6 may be disposed on a side that is opposite to the scanning drive mirror 3 on the basis of the mirror 16, on an extended line of the optical path A (refer to FIG. 2). Here, the mirror 16 is an optical member having a function of reflecting a part (for example, 50%) of incident second laser light L2 and of allowing the remainder (for example, 50%) of the incident second laser light L2 to be transmitted therethrough. According to this, a part of second laser light L2 emitted from the second emission unit 22 is reflected by the mirror 16 and proceeds along the optical path A. On the other hand, a part of the second laser light L2 that returned again to the inside of the body 7 is transmitted through the mirror 16 and is detected by the light detection unit 6.

In addition, the light detection unit 6 may be a light detector having sensitivity in a wavelength region of the second laser light L2. For example, in the projection display device 1 according to the second embodiment, the wavelength region of the first laser light L1 and the wavelength region of the second laser light L2 are visible regions, and thus the light detector having sensitivity in the visible region can be used as the light detection unit 6. In addition, the light detection unit 6 may be a semiconductor light detector.

Figure 9:
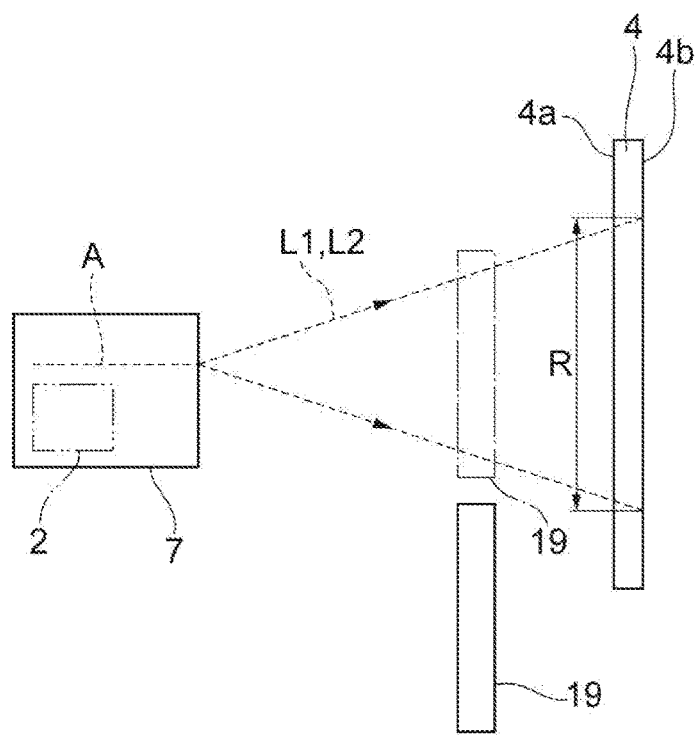
FIG. 9 is a schematic view of a modification example of a part of the projection display device according to the first embodiment.

In addition, the projection display device 1 may further include a shutter 19. As the process to terminate displaying the projection as an example of the process to stop displaying the projection, as illustrated in FIG. 9, the control unit 8 may dispose the shutter 19 on the optical path of the first laser light L1 used in the scanning by the scanning drive mirror 3. The shutter 19 can advance and retreat on the optical path of the first laser light L1 used in the scanning by the scanning drive mirror 3. Even in this case, in a case where a defect occurs in the predetermined region R of the light diffusion unit 4 during displaying the projection, it is possible to reliably terminate displaying the projection. On the other hand, the shutter 19 may advance and retreat on the optical path (that is, the optical path of the light L0 for displaying a projection) of the first laser light L1 that is transmitted through the predetermined region R of the light diffusion unit 4.

In addition, as the process to terminate displaying the projection, the control unit 8 may allow the first emission units 21a, 21b, and 21c to reduce an output of the first laser light L1. In addition, as the process to terminate displaying the projection, the control unit 8 may operate the scanning drive mirror 3 so that the first laser light L1 is incident to regions other than the predetermined region R of the light diffusion unit 4. In this case, for example, it is preferable that a non-transmission treatment is performed to regions other than the predetermined region R of the light diffusion unit 4 in order for the first laser light L1 not to be leaked to the outside of the projection display device 1.

Figure 10:
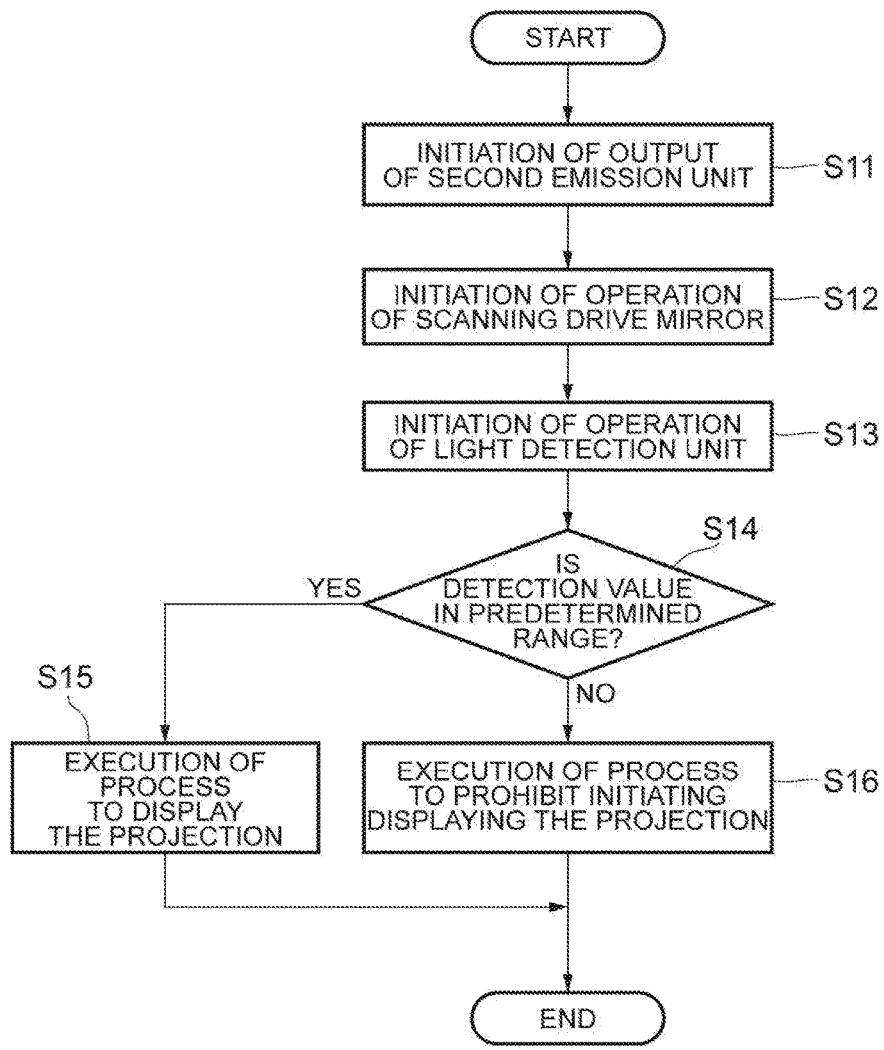
FIG. 10 is a flowchart illustrating a first modification example of the process executed by the control unit of the projection display device according to the first embodiment.

Description will be given of a first modification example of the process executed by the control unit 8 (example in which the process to detect the second laser light L2 is executed before displaying the projection) with reference to FIG. 10.

First, when receiving an input signal to initiate displaying a projection, the control unit 8 initiates output of the second emission unit 22 (step S11). According to this, the second laser light L2 is emitted from the second emission unit 22.

The control unit 8 initiates an operation of the scanning drive mirror 3 approximately simultaneously with step S11 (step S12), and the control unit 8 initiates an operation of the light detection unit 6 approximately simultaneously with steps S11 and S12 (step S13). According to this, in the scanning drive mirror 3, swinging of the mirror 3a is initiated, and the predetermined region R of the light diffusion unit 4 is scanned with the second laser light L2 emitted from the light source 2 along a scanning line of the first laser light L1 for displaying a projection.

At this time, the second laser light L2 for inspection used in the scanning by the scanning drive mirror 3 is diffused by the predetermined region R of the light diffusion unit 4, and is reflected by the light selection unit 5. The second laser light L2 reflected by the light selection unit 5 is transmitted again through the light diffusion unit 4 and is detected by the light detection unit 6.

Here, the control unit 8 receives a detection value related to an optical quantity of the second laser light L2 from the light detection unit 6. The detection value is correlated to a scanning position of the second laser light L2 in the predetermined region R of the light diffusion unit 4. In addition, the control unit 8 determines a state of the predetermined region R of the light diffusion unit 4 on the basis of the detection value (step S14). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of the predetermined region R of the light diffusion unit 4 is normal, and executes the process to display the projection (step S15).

As execution of the process to display the projection, the control unit 8 initiates output of each of the plurality of first emission units 21a, 21b, and 21c. According to this, the light L0 for displaying a projection is guided to the front glass 100 of the vehicle by the planar mirrors 11 and 12 and the concave mirror 13, and reaches eyes of a driver as a video after reflection from the front glass 100 of the vehicle.

On the other hand, in a case where the detection value is out of the predetermined range from the reference value, the control unit 8 determines that a defect occurs in the predetermined region R of the light diffusion unit 4 as the state of the predetermined region R of the light diffusion unit 4, and executes a process to prohibit initiating displaying the projection (step S16). As the process to prohibit initiating displaying the projection, even in the case of receiving the input signal to initiate displaying the projection, the control unit 8 does not allow the first emission units 21a, 21b, and 21c to initiate emission of the first laser light L1.

According to this, displaying the projection is prohibited from being initiated by the predetermined region R of the light diffusion unit 4 in which the defect occurs, and thus it is possible to prevent a burden from being placed on eyes of a person who views the projection displayed. Furthermore, it is not necessary for the control unit 8 to execute the process to detect the second laser light L2 whenever receiving the input signal to initiate displaying the projection. For example, the control unit 8 may execute process to detect the second laser light L2 once whenever the input signal to initiate displaying the projection is received plural times.

Figure 11:
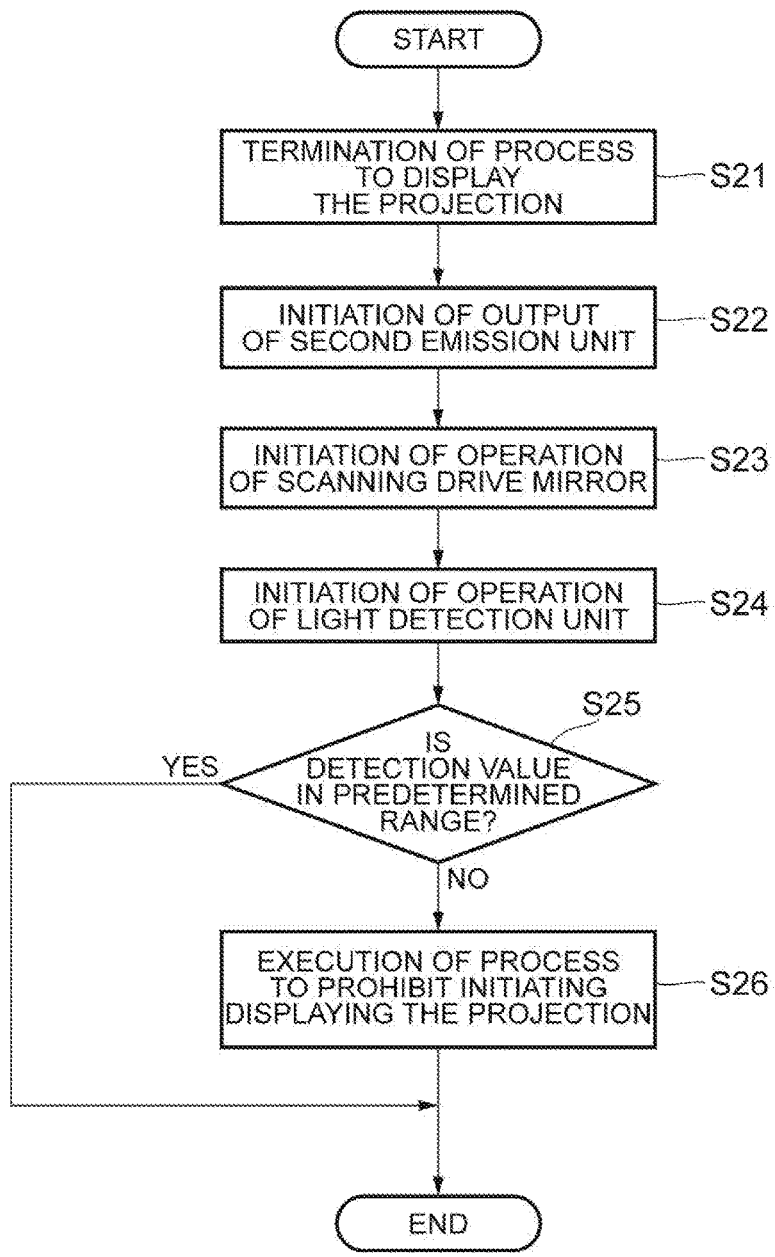
FIG. 11 is a flowchart illustrating a second modification example of the process executed by the control unit of the projection display device according to the first embodiment.

Next, description will be given of a second modification example of the process executed by the control unit 8 (example in which the process to detect the second laser light L2 is executed after displaying the projection) with reference to FIG. 11.

First, the control unit 8 terminates the process to display the projection (step S21). As termination of the process to display the projection, the control unit 8 stops the output of each of the plurality of first emission units 21a, 21b, and 21c, and stops the operation of the scanning drive mirror 3.

Next, the control unit 8 initiates output of the second emission unit 22 (step S22). According to this, the second laser light L2 is emitted from the second emission unit 22.

The control unit 8 initiates an operation of the scanning drive mirror 3 approximately simultaneously with step S22 (step S23), and the control unit 8 initiates an operation of the light detection unit 6 approximately simultaneously with steps S22 and S23 (step S24). According to this, in the scanning drive mirror 3, swinging of the mirror 3a is initiated, and the predetermined region R of the light diffusion unit 4 is scanned with the second laser light L2 emitted from the light source 2 along a scanning line of the first laser light L1 for displaying a projection. On the other hand, when terminating the process to display the projection, the control unit 8 may continue the operation of the scanning drive mirror 3 until step S23 without stopping the operation of the scanning drive mirror 3.

According to this, the second laser light L2 for inspection used in the scanning by the scanning drive mirror 3 is diffused by the predetermined region R of the light diffusion unit 4 and is reflected by the light selection unit 5. The second laser light L2 reflected by the light selection unit 5 is transmitted again through the light diffusion unit 4, and is detected by the light detection unit 6.

Here, the control unit 8 receives a detection value related to the optical quantity of the second laser light L2 from the light detection unit 6. The detection value is correlated to a scanning position of the second laser light L2 in the predetermined region R of the light diffusion unit 4. In addition, the control unit 8 determines a state of the predetermined region R of the light diffusion unit 4 on the basis of the detection value (step S25). More specifically, the control unit 8 stores a reference value related to the optical quantity of the second laser light L2 in correlation with the scanning position of the second laser light L2 in the predetermined region R of the light diffusion unit 4. In correspondence with the scanning position of the second laser light L2 in the predetermined region R of the light diffusion unit 4, the control unit 8 compares the detection value and the reference value that correspond to the position. In a case where the detection value is in a predetermined range from the reference value, the control unit 8 determines that the state of the predetermined region R of the light diffusion unit 4 is normal, and terminates the process as it is.

On the other hand, in a case where the detection value is out of the predetermined range from the reference value, the control unit 8 determines that a defect occurs in the predetermined region R of the light diffusion unit 4 as the state of the predetermined region R of the light diffusion unit 4, and executes a process to prohibit initiating displaying the projection (step S26). Even in the case of receiving the input signal to initiate displaying the projection, as the process to prohibit initiating displaying the projection, the control unit 8 does not allow the first emission units 21a, 21b, and 21c to initiate emission of the first laser light L1.

According to this, displaying the projection is prohibited from being initiated by the predetermined region R of the light diffusion unit 4 in a defect occurs, and thus it is possible to prevent a burden from being placed on eyes of a person who views the projection displayed. Furthermore, it is not necessary for the control unit 8 to execute the process to detect the second laser light L2 whenever terminating the process to display the projection. For example, the control unit 8 may execute the process to detect the second laser light L2 once whenever the process to display the projection is terminated plural times.

Furthermore, in the projection display device 1 according to the respective embodiments, there is a concern that when executing a process to inspect the second laser light L2 before displaying the projection or after displaying the projection, the laser light emitted from the light source 2 may be emitted to the outside of the projection display device 1, and a burden may be placed on eyes of a person who views the projection displayed. Therefore, it is preferable that the projection display device 1 further includes a shutter that can advance and retreat on the optical path of the light L0. According to this, even when an emission optical quantity of the laser light is raised to reliably detect the second laser light L2, it is possible to prevent a burden from being placed on eyes of a person who views the projection displayed by locating the shutter on the optical path of the light L0.

Furthermore, as the process to prohibit initiating displaying the projection that is an example of the process to stop displaying the projection, for example, even when receiving the input signal to initiate displaying the projection, the control unit 8 may execute a process not to operate the scanning drive mirror 3, or may execute a process not to move the shutter 19 on the optical path of the first laser light L1.

In addition, the projection display device 1 may be used in various aspects such as a helmet-embedded type, an eyeglass type without limitation to the vehicle-mounted type.

INDUSTRIAL APPLICABILITY

According to the invention, it is possible to provide a projection display device capable of preventing a burden being placed on eyes of a person who views projection displayed.

REFERENCE SIGNS LIST

1: Projection display device, 2: Light source, 3: Scanning drive mirror (drive reflection unit), 4: Light diffusion unit, 5, 17: Light selection unit, 6: Light detection unit, 8: Control unit, 19: Shutter, L1: First laser light, L2: Second laser light, R: Predetermined region.

The invention claimed is:

1. A projection display device, comprising:
a light source that emits a first laser light for displaying a projection and a second laser light for inspection;
a drive reflection unit that reflects the first laser light and the second laser light emitted from the light source, and uses the first laser light and the second laser light in scanning;
a light diffusion unit that includes a predetermined region that allows the first laser light used in the scanning by the drive reflection unit to be transmitted through the predetermined region, and diffuses the first laser light;
a light detection unit that detects the second laser light that passed the predetermined region of the light diffusion unit; and
a control unit that executes a process to detect the second laser light, and determines a state of the predetermined region of the light diffusion unit on the basis of a detection value of the light detection unit,
wherein the light diffusion unit is a microlens array, and in a case where the control unit determines that a defect occurs in the predetermined region of the light diffusion unit as the state of the predetermined region of the light diffusion unit, the control unit executes a process to stop displaying the projection,
the projection display device further comprises a mirror that guides the first laser light diffused by the predetermined region of the light diffusion unit, and
wherein the light diffusion unit is a microlens array disposed between the drive reflection unit and the mirror.

2. The projection display device according to claim 1, wherein the control unit executes the process to detect the second laser light during displaying the projection, and in a case where the control unit determines that the defect occurs in the predetermined region of the light diffusion unit, the control unit executes a process to terminate displaying the projection as the process to stop displaying the projection.

3. The projection display device according to claim 2, wherein the control unit allows the light source to stop emission of the first laser light as the process to terminate displaying the projection.

4. The projection display device according to claim 2, further comprising:
a shutter that is capable of advancing and retreating on an optical path of the first laser light used in the scanning by the drive reflection unit, or on an optical path of the first laser light transmitted through the predetermined region of the light diffusion unit,
wherein the control unit disposes the shutter on the optical path of the first laser light as the process to terminate displaying the projection.

5. The projection display device according to claim 1, wherein the control unit executes the process to detect the second laser light at least one of before displaying the projection and after displaying the projection, and in a case where the control unit determines that a defect occurs in the predetermined region of the light diffusion unit, the control unit executes a process to prohibit initiating displaying the projection as the process to stop displaying the projection.

6. The projection display device according to claim 1, further comprising:
a light selection unit that allows the first laser light to be transmitted through the light selection unit and reflects the second laser light at a position on an incident surface of the light diffusion unit in the predetermined region, at a position on an emission surface of the light diffusion unit in the predetermined region, or at a position that is distant from the emission surface toward an emission side of the light diffusion unit,
wherein the light detection unit detects the second laser light reflected by the light selection unit.

7. The projection display device according to claim 1, wherein the light detection unit detects the second laser light that proceeds outside of the optical path of the first laser light in the second laser light transmitted through the predetermined region of the light diffusion unit and diffused by the predetermined region.

8. The projection display device according to claim 1, further comprising:
a light selection unit that reflects the first laser light transmitted through the predetermined region of the light diffusion unit, and allows the second laser light transmitted through the predetermined region of the light diffusion unit to be transmitted through the light selection unit, wherein the light detection unit detects the second laser light transmitted through the light selection unit.

* * * * *